United States Patent
Sopp et al.

(10) Patent No.: US 12,510,016 B2
(45) Date of Patent: Dec. 30, 2025

(54) INTERNAL COMBUSTION ENGINE POWERED SYSTEM, CHARGE AIR COOLER ASSEMBLY, AND METHOD OF COOLING CHARGE AIR

(71) Applicant: Cummins, Inc., Columbus, IN (US)

(72) Inventors: Daniel C. Sopp, Northampton (GB); Kshitij Batra, Pune (IN); Damon C. Salo, Columbus, IN (US); Nicholas William Shatek, Shoreview, MN (US)

(73) Assignee: Cummins, Inc., Columbus, IN (US)

( * ) Notice: Subject to any disclaimer, the term of this patent is extended or adjusted under 35 U.S.C. 154(b) by 0 days.

(21) Appl. No.: 18/634,573

(22) Filed: Apr. 12, 2024

(65) Prior Publication Data
US 2025/0320831 A1  Oct. 16, 2025

(51) Int. Cl.
*F02B 29/04* (2006.01)
*F02B 37/00* (2006.01)
*F02B 37/013* (2006.01)

(52) U.S. Cl.
CPC ...... *F02B 29/0456* (2013.01); *F02B 29/0406* (2013.01); *F02B 29/0412* (2013.01); *F02B 29/0425* (2013.01); *F02B 29/0431* (2013.01); *F02B 37/013* (2013.01); *F02B 37/004* (2013.01)

(58) Field of Classification Search
CPC .......... F02B 29/04–0456; F02B 37/004; F02B 37/013
See application file for complete search history.

(56) References Cited

U.S. PATENT DOCUMENTS

| | | | |
|---|---|---|---|
| 6,782,849 B2 * | 8/2004 | Roithinger | F02B 29/0475 123/41.56 |
| 8,857,416 B2 | 10/2014 | Baumann | |
| 9,010,117 B2 | 4/2015 | Genter | |
| 9,228,485 B2 | 1/2016 | Svihla et al. | |
| 9,790,847 B2 | 10/2017 | Genter et al. | |
| 10,047,664 B2 | 8/2018 | Nishiura et al. | |
| 11,448,118 B2 | 9/2022 | Sturm et al. | |
| 2002/0189786 A1 * | 12/2002 | Fischer | F28D 1/0426 165/41 |
| 2013/0199162 A1 | 8/2013 | Schlemmer-Kelling | |

(Continued)

FOREIGN PATENT DOCUMENTS

| | | | | |
|---|---|---|---|---|
| DE | 10309808 A1 * | 10/2003 | | F01P 3/18 |
| EP | 2 307 683 A1 | 4/2011 | | |

(Continued)

*Primary Examiner* — Laert Dounis
(74) *Attorney, Agent, or Firm* — Foley & Lardner LLP (57) ABSTRACT

An engine system includes a charge air cooler assembly that is configured to direct air to different parts of the engine system and to reduce overall void volume within the air intake system. The charge air cooler assembly includes a first stage air-to-air cooler arranged to direct a first charge air along a first direction from an inlet to an outlet of the first stage air-to-air cooler. The charge air cooler assembly also includes a second stage air-to-air cooler arranged to direct a second charge air along a second direction from an inlet to an outlet of the second stage air-to-air cooler that is different from the first direction. In some embodiments, the first stage air-to-air cooler and the second stage air-to-air cooler are each disposed in a parallel flow arrangement relative to an air driver of the engine system.

19 Claims, 5 Drawing Sheets

(56) References Cited

U.S. PATENT DOCUMENTS

2013/0298536 A1 11/2013 Bourgoin
2017/0022884 A1 1/2017 Takahata et al.

FOREIGN PATENT DOCUMENTS

EP    2 798 171 A1   11/2014
FR       2938051      5/2010
JP      60-101223 A   6/1985

* cited by examiner

INTERNAL COMBUSTION ENGINE POWERED SYSTEM, CHARGE AIR COOLER ASSEMBLY, AND METHOD OF COOLING CHARGE AIR

TECHNICAL FIELD

The present disclosure relates generally to air intake systems for turbocharged liquid or gaseous fueled engine systems.

BACKGROUND

Many liquid or gaseous fueled engine systems use turbochargers to improve the efficiency (e.g., fuel consumption) and power output of the engine system. The turbocharger compressor compresses incoming air, increasing the density of the air, to thereby allow more power per engine cycle. Turbocharged engine systems for generator systems typically include a liquid cooled charge air cooler, commonly referred to as an intercooler, to increase the density of charge air entering the engine and improve system performance.

SUMMARY

One embodiment of the present disclosure relates to a generator system. The generator system includes a generator, an engine coupled to the generator, a first stage turbocharger coupled to the engine, a first stage air-to-air cooler, a second stage turbocharger, and a second stage air-to-air cooler. The first stage air-to-air cooler is fluidly coupled to the first stage turbocharger to receive a first charge air therefrom. The first stage air-to-air cooler is arranged to direct the first charge air along a first direction from an inlet of the first stage air-to-air cooler to an outlet of the first stage air-to-air cooler. The second stage turbocharger is fluidly coupled to the first stage air-to-air cooler. The second stage air-to-air cooler is fluidly coupled to the second stage turbocharger to receive a second charge air therefrom. The second stage air-to-air cooler is separate from the first stage air-to-air cooler, and is arranged to direct the second charge air along a second direction from an inlet of the second stage air-to-air cooler to an outlet of the second stage air-to-air cooler. The second direction is different from the first direction.

Another embodiment of the present disclosure is a charge air cooler assembly. The charge air cooler assembly includes a first stage air-to-air cooler, and a second stage air-to-air cooler. The first stage air-to-air cooler is configured to receive a first charge air. The first stage air-to-air cooler is arranged to direct the first charge air along a first direction from an inlet of the first stage air-to-air cooler to an outlet of the first stage air-to-air cooler. The second stage air-to-air cooler is configured to receive a second charge air. The second stage air-to-air cooler is separate from the first stage air-to-air cooler, and is arranged to direct the second charge air away from the first stage air-to-air cooler along a second direction from an inlet of the second stage air-to-air cooler to an outlet of the second stage air-to-air cooler. The second direction is different from the first direction.

Another embodiment of the present disclosure relates to a method of cooling charge air for an engine-generator system. The method includes compressing air using a first stage turbocharger to produce a first charge air; cooling the first charge air by passing the first charge air through a first stage air-to-air cooler along a first direction; compressing the first charge air using a second stage turbocharger to produce a second charge air; and cooling the second charge air by passing the second charge air through a second stage air-to-air cooler that is separate from the first stage air-to-air cooler and away from the first stage air-to-air cooler along a second direction that is different from the first direction.

It should be appreciated that all combinations of the foregoing concepts and additional concepts discussed in greater detail below (provided such concepts are not mutually inconsistent) are contemplated as being part of the subject matter disclosed herein. In particular, all combinations of claimed subject matter appended at the end of this disclosure are contemplated as being part of the subject matter disclosed herein.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several implementations in accordance with the disclosure and are therefore, not to be considered limiting of its scope, the disclosure will be described with additional specificity and detail through use of the accompanying drawings.

Reference is made to the accompanying drawings throughout the following detailed description. In the drawings, similar symbols typically identify similar components, unless context dictates otherwise. The illustrative implementations described in the detailed description, drawings, and claims are not meant to be limiting. Other implementations can be utilized, and other changes can be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

DETAILED DESCRIPTION

Embodiments described herein relate generally to methods and systems for cooling charge air for an engine-generator system. In particular, embodiments described herein relate generally to a charge air cooling systems for a two-stage turbocharged engine system.

Referring to the figures generally, a charge air cooling assembly for a two-stage turbocharged engine system is shown that is configured to both cool and transfer the air to different parts of the engine system. The charge air cooler includes a first charge air cooler (e.g., a low-pressure charge air cooler, etc.) arranged to direct charge air along a first direction, such as from a lower end to an upper end of the engine (e.g., vertically). The charge air cooler also includes a second charge air cooler (e.g., a high-pressure charge air cooler, etc.) that is arranged to direct charge air along a second direction that is different from the first direction, such as from an intake side to an exhaust side of the engine (e.g., horizontally). The first charge air cooler and second charge air cooler are both arranged to direct the flow of charge air closer to an intended destination along the engine system, such as from a first stage turbocharger (e.g., a low-pressure turbocharger, etc.) to a second stage turbocharger (e.g., a high-pressure turbocharger, etc.), and/or between the intake and exhaust sides of the engine system. In this manner, both the first stage air cooler and the second stage air cooler function as air transfer conduits that redirect air to different parts of the engine system, thereby eliminating the need for additional plumbing hardware to transfer charge air to a required location along the engine.

In some embodiments, the charge air coolers can be mounted in a parallel flow arrangement relative to the engine, which can further reduce the length of air transfer hardware, and the overall void volume associated with the air intake system. Such an arrangement can be particularly beneficial in genset applications requiring high power density, and in which available space within the genset enclosure can be limited. Reducing the length of plumbing along the charge air stream can also improve engine performance, by reducing the transient effects associated with the size of the air volume between the turbochargers and the engine itself. Such transient effects in engine speed and torque can have a major effect on fuel consumption and emissions in certain applications.

In some embodiments, both the first charge air cooler and the second charge air coolers are air-to-air coolers, which can eliminate the need for additional hardware such as fluid transfer pumps, auxiliary heat exchangers, and coolant reservoirs for liquid cooled charge air systems that are traditionally used in stationary engine-generator applications.

As used herein, "charge air" refers to pressurized/compressed air produced by one or more turbocharger compressors that is delivered to the engine system.

Figure 1:
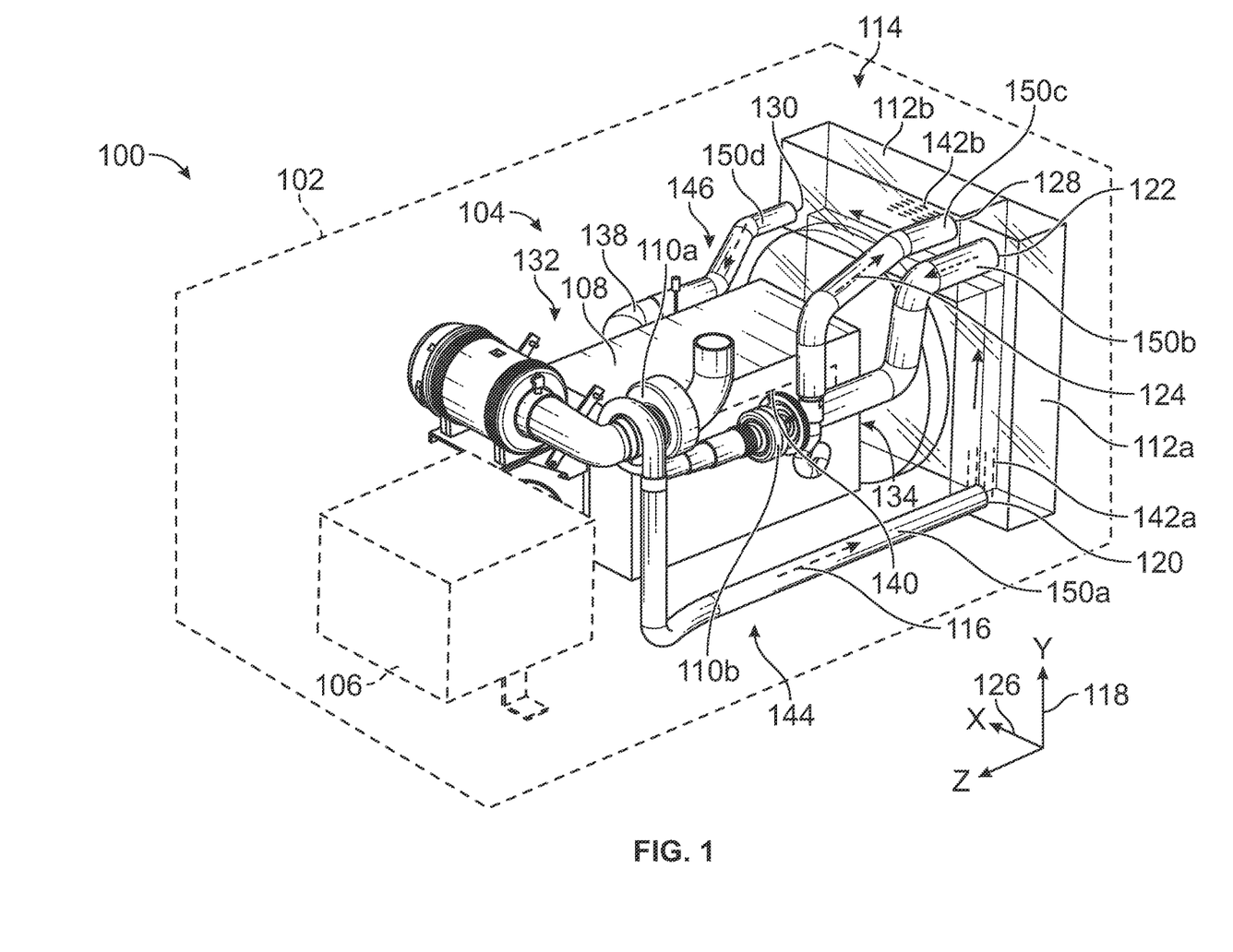
FIG. 1 is a perspective view of an engine powered system that includes a charge air cooler assembly, according to an embodiment.

Referring to FIG. 1, a two-stage turbocharged engine system 100 (e.g., an engine-generator system, and internal combustion engine powered system, etc.) is shown, according to an embodiment. In some embodiments, the engine system 100 includes a generator enclosure 102 and a generator set 104 disposed therein. The generator set 104 (e.g., genset) is configured to generate electrical power in various applications. For example, the generator set 104 can be configured as a standby generator set 104 that is configured to provide backup power to various equipment in the event of a power outage.

In the embodiment of FIG. 1, the system 100 includes a generator 106. The system 100 also includes an engine 108 coupled to the generator 106. The system 100 further includes a first stage turbocharger 110a (e.g., a low-pressure turbocharger, etc.) coupled to the engine 108, a first stage air-to-air cooler 112a, a second stage turbocharger 110b (e.g., a high-pressure turbocharger operating at a higher pressure than the first stage turbocharger 110a, etc.), and a second stage air-to-air cooler 112b. The first stage air-to-air cooler 112a is fluidly coupled to the first stage turbocharger 110a to receive a first charge air 116 (e.g., a low-pressure charge air, etc.) therefrom. The first stage air-to-air cooler 112a is arranged to direct the first charge air 116 along a first direction 118 from an inlet 120 of the first stage air-to-air cooler 112a to an outlet 122 of the first stage air-to-air cooler 112a. The second stage turbocharger 110b is fluidly coupled to the first stage air-to-air cooler 112a. The second stage air-to-air cooler 112b is fluidly coupled to the second stage turbocharger 110b to receive a second charge air 124 (e.g., a high-pressure charge air at higher pressure than the first charge air 116, etc.) therefrom. The second stage air-to-air cooler 112b is separate from the first stage air-to-air cooler 112a, and is arranged to direct the second charge air 124 along a second direction 126 from an inlet 128 of the second stage air-to-air cooler 112b to an outlet 130 of the second stage air-to-air cooler 112b. The second direction 126 is different from the first direction 118.

The engine 108 can be a diesel engine, a gasoline engine, a natural gas engine, a dual fuel engine, a biodiesel engine, an E85 engine, a flex fuel engine, or another type of internal combustion engine or driver. In various embodiments, the engine 108 can be a high horsepower (HHP) engine, such as, for example, an engine capable of providing power in the range of 500 hp to 4,500 hp or more.

In the embodiment of FIG. 1, the engine 108 includes an intake side 132 and an opposing exhaust side 134. The engine 108 includes an intake manifold 138 disposed on the intake side 132 configured to receive and direct air to a cylinder head of the engine 108. The engine 108 includes an exhaust manifold 140 disposed on the exhaust side 134 and spaced apart from the intake manifold 138. In the embodiment of FIG. 1, the engine 108 is an inline engine in which the intake manifold 138 is disposed on an opposite end of an engine block of the engine 108 from the intake side 132. In other embodiments, the engine can be a Vee engine (shown in FIG. 6) having cylinder banks arranged at an angle to each other, so that the banks form a "V" shape when viewed from the front of the engine. In yet other embodiments, the engine can be arranged in another configuration having a different spatial relationship between the intake manifold 138 and the exhaust manifold 140. The exhaust manifold 140 is configured to receive combustion gases from the cylinder head during operation.

The engine 108 can be used to power an electric power generator 106 (e.g., genset, etc.) used to produce electricity (e.g., power), an alternator, or another auxiliary device or system. For example, the engine 108 can be used as part of an auxiliary power unit to generate power in emergency situations, during storms, or to supplement existing power sources. In one embodiment, the engine 108 is coupled to the generator 106 by, for example, a driveshaft (e.g., a crankshaft, etc.) (not shown). In other embodiments, the engine 108 can be used to power a truck, a boat, a locomotive, or another type of vehicle (e.g., an on-road or off-road vehicle), such as vehicles that include a generator in the form of an alternator. In yet other embodiments, the engine 108 can be used in an industrial application to drive a pump, hydraulic system, or to power another type of internal combustion engine powered device or system.

In the embodiment of FIG. 1, the engine 108 is a two-stage turbocharged engine that includes the first stage turbocharger 110a and the second stage turbocharger 110b (collectively, turbochargers 110). The turbochargers 110 draw in filtered ambient air and compress the air before delivering the charge air (e.g., compressed air, etc.) to the engine 108 (e.g., via at least one intake manifold between the turbochargers 110 and the engine 108, etc.). The turbochargers 110 increase the mass of air entering the engine 108 during each engine cycle, which increases the volumetric efficiency and power production of the engine 108.

Each of the turbochargers 110 includes an impeller (e.g., a rotor) that rotates at high speed to draw in and pressurize the filtered air. The impeller is mechanically connected to a turbine, which powers the impeller by recovering some of the enthalpy and kinetic energy of the exhaust gasses leaving the engine 108. In other embodiments, the impeller is driven by an electric motor, an engine crankshaft, and/or another source of shaft power. The size and geometry of each compressor impeller can vary depending on the required engine air flow rate, the desired compression ratio of air across the turbochargers 110, and other factors. The performance of each of the turbochargers 110 can also vary depending on a variety of factors, including the design of the intake system upstream of the turbochargers 110 (e.g., the velocity profile of flow entering the turbochargers 110, the compressor inlet pressure, the charge air volume within the intake system, etc.).

Various embodiments of the present disclosure relate to a charge air cooler assembly 114 that is configured to be mounted within the generator enclosure 102 separately from the engine 108.

Referring still to FIG. 1, the charge air cooler assembly 114 includes the first stage air-to-air cooler 112a and the second stage air-to-air cooler 112b (collectively, air-to-air coolers 112). The first stage air-to-air cooler 112a is configured to receive the first charge air 116. The first stage air-to-air cooler 112a is arranged to direct the first charge air 116 along the first direction 118 from the inlet 120 of the first stage air-to-air cooler 112a to the outlet 122 of the first stage air-to-air cooler 112a. The second stage air-to-air cooler 112b is configured to receive the second charge air 124. The second stage air-to-air cooler 112b is separate from the first stage air-to-air cooler 112a, and is arranged to direct the second charge air 124 away from the first stage air-to-air cooler 112a along the second direction 126 from the inlet 128 of the second stage air-to-air cooler 112b to the outlet 130 of the second stage air-to-air cooler 112b. The second direction 126 is different from the first direction 118.

The air-to-air coolers 112 are formed separately from one another. In particular, the air-to-air coolers 112 are formed as separate heat exchanges that operate independently of one another. In some embodiments, at least one of the air-to-air coolers 112 is a fin tube heat exchanger that includes a plurality of tubes 142 extending between the inlet and the outlet, with fins therebetween. In other embodiments, at least one of the air-to-air coolers 112 is a stacked plate heat exchanger that includes a plurality of stacked plates and finned chambers to transfer energy between two fluids. In yet other embodiments, the air-to-air coolers 112 can be made from another type of air-to-air heat exchanger geometry.

In the embodiment of FIG. 1, the first stage air-to-air cooler 112a includes a first plurality of tubes 142a (e.g., lines, conduits, etc.) extending along the first direction 118. The first plurality of tubes 142a defines a first plurality of fluid passages (e.g., channels, etc.) for receiving the first charge air 116 from the first stage turbocharger 110a. The first charge air 116 can be a low-pressure charge air that is at a reduced pressure relative to the second charge air 124 leaving the second stage turbocharger 110b.

The first plurality of tubes 142a is configured to direct the first charge air 116 along the first direction 118 (e.g., substantially parallel to the first direction 118) from the inlet 120 to the outlet 122 of the first stage air-to-air cooler 112a. In some embodiments, the first direction 118 can be a vertical direction that is substantially perpendicular to a ground surface (e.g., a floor) of the generator enclosure 102.

For example, the outlet 122 of the first stage air-to-air cooler 112a can be disposed vertically above the inlet 120 of the first stage air-to-air cooler 112a. In other embodiments, the arrangement can be reversed such that the outlet 122 of the first stage air-to-air cooler 112a is disposed vertically below the inlet 120. In the embodiment of FIG. 1, the first direction 118 extends in a vertical direction relative to a ground surface or platform on which the engine 108 is positioned, between a lower end 144 of the engine 108 and an upper end 146 of the engine 108. In some embodiments (as shown in FIG. 1), the first direction 118 extends from a lower end 144 of the engine 108 to an upper end 146 of the engine 108. The lower end 144 can be, for example, a lower end of the engine block, proximate to a floor of the generator enclosure 102. The upper end 146 can be, for example, an upper end of the engine block, proximate to a cylinder head of the engine block. Such an arrangement can also facilitate removal and drainage of condensate along the tubes of the first stage air-to-air cooler 112a during operation, which can reduce the risk of fouling of the heat exchanger, and improve flow and heat transfer performance.

It should be appreciated that in other embodiments having alternative engine configurations (e.g., a Vee engine, etc.), the first direction 118 and/or the second direction 126 can be different to enable routing of flow between the turbochargers and between a hot side of the engine at which the turbochargers are located and a cold side (e.g., an intake side, etc.) of the engine. For example, the first direction 118 could extend along an angle relative to a vertical reference line depending on the arrangement of the turbochargers, etc., to reduce the length of conduits used to route the flow between the turbochargers.

The first plurality of tubes 142a form a first air conduit that is configured to move the first charge air 116 at least partially from the first stage turbocharger 110a toward the second stage turbocharger 110b. Such an arrangement can reduce the length of air transfer conduits and/or other hardware that is required to transfer the first charge air 116 to the second stage turbocharger 110b and the overall volume of the first charge air 116 in the engine system.

Referring still to FIG. 1, the second stage air-to-air cooler 112b can have a substantially similar design as the first stage air-to-air cooler 112a. In some embodiments, the second stage air-to-air cooler 112b includes a second plurality of tubes 142b extending along the second direction 126. The second plurality of tubes 142b defines a second plurality of fluid passages (e.g., channels, etc.) for receiving the second charge air 124 from the second stage turbocharger 110b. The second charge air 124 can be a high-pressure charge air having greater pressure relative to the first charge air 116 leaving the first stage turbocharger 110a.

The second plurality of tubes 142b is configured to direct the second charge air 124 along the second direction 126 from the inlet 128 to the outlet 130 of the second stage air-to-air cooler 112b. In the embodiment of FIG. 1, the second direction 126 is substantially perpendicular to the first direction 118. The second direction 126 can be a horizontal direction that is substantially parallel to a ground surface (e.g., a floor) of the generator enclosure 102.

Figure 2:
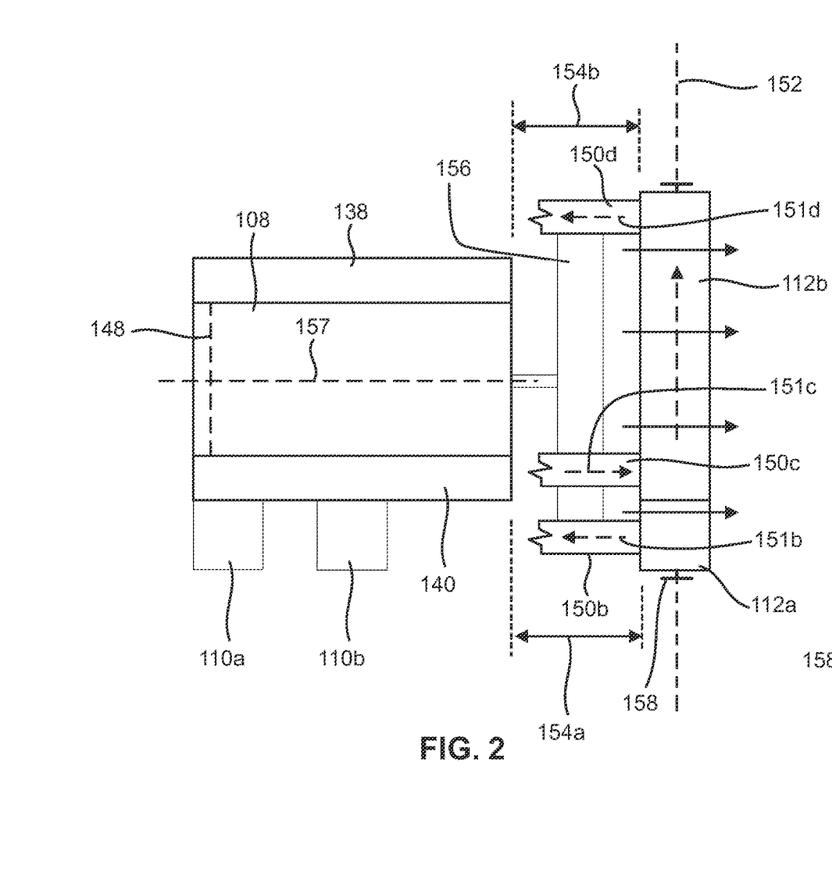
FIG. 2 is a top view of the engine-generator system and charge air cooler assembly of FIG. 1.

In some embodiments, the second direction 126 extends substantially parallel to a reference line 148 representing (e.g., extending along) a shortest linear distance between the intake manifold 138 and the exhaust manifold 140 (see FIG. 2). In some embodiments, the second direction 126 extends from a right side of the engine 108, when viewed from above the engine 108, to a left side of the engine 108 opposite the right side (see FIG. 2).

The second plurality of tubes 142*b* form a second air conduit that is configured to move the second charge air 124 from the outlet 130 of the second stage air-to-air cooler 112*b* toward the intake of the engine 108 (e.g., an air intake for the cylinder head, the intake manifold 138, etc.).

In the embodiment of FIG. 1, the second stage air-to-air cooler 112*b* forms a second air conduit for the second charge air 124 that directs the second charge air 124 from a hot side of the engine 108 (e.g., a side of the engine 108 to which the turbochargers 110 are mounted) to a cold side of the engine 108 at a lower temperature than the hot side during engine operation. Such an arrangement can reduce the length of air transfer tubes and/or other hardware that is required to transfer the second charge air 124 from the second stage air-to-air cooler to the engine 108 and the overall volume of the second charge air 124 in the engine system.

The system 100 also includes a plurality of fluid conduits (e.g., air conduits, tubes, hoses, etc.) for directing the charge air between different components along the intake system. In the embodiment of FIG. 1, the system 100 includes a first conduit 150*a*, a second conduit 150*b*, a third conduit 150*c*, and a fourth conduit 150*d* (collectively, conduits 150). It should be understood that the system 100 can include different numbers and/or arrangements of fluid conduits in different embodiments.

In the embodiment of FIG. 1, the first conduit 150*a* fluidly couples the first stage turbocharger 110*a* to the inlet 120 of the first stage air-to-air cooler 112*a* and is configured to move the first charge air 116 at elevated temperature therebetween. The second conduit 150*b* fluidly couples the outlet 122 of the first stage air-to-air cooler 112*a* to the second stage turbocharger 110*b* and is configured to move the first charge air 116 therebetween at reduced temperature relative to the first charge air 116 in the first conduit 150*a*.

The third conduit 150*c* fluidly couples the second stage turbocharger 110*b* to the inlet 128 of the second stage air-to-air cooler 112*b* and is configured to move the second charge air 124 at elevated temperature therebetween (at elevated temperature relative to the first charge air 116 entering the second stage turbocharger 110*b*). The fourth conduit 150*d* extends away from the outlet 130 of the second stage air-to-air cooler 112*b* and is configured to direct the second charge air 124, at reduced pressure relative to the second charge air 124 leaving the second stage turbocharger 110*b*, to the engine 108 (e.g., to the intake manifold 138, etc.).

Referring to FIG. 2, the first conduit 150*a* (see also FIG. 1), the second conduit 150*b*, the third conduit 150*c*, and the fourth conduit 150*d* each extend parallel to one another at a location adjacent to the first stage air-to-air cooler 112*a* and the second stage air-to-air cooler 112*b*. For example, the conduits 150 can extend parallel to one another in a region of the conduits 150 extending from the connection to the air-to-air coolers 112. A central axis 151*a*, 151*b*, 151*c*, 151*d* (collectively, central axes 151) of the flow passages defined by each of the conduits 150 are oriented substantially parallel to one another along a first length of the conduits 150 extending from one of the first stage air-to-air cooler 112*a* or the second stage air-to-air cooler 112*b*. The substantially linear portion of each conduit can reduce pressure drop across the charge air system and can reduce the number of bends in the charge air assembly that would otherwise collectively increase the overall charge air volume. In other embodiments, the central axis of at least one flow passage defined by the conduits 150 can be angled relative to the other conduits 150 extending from the air-to-air coolers 112.

The air-to-air coolers 112 include heat exchangers configured to transfer heat between the charge air and ambient air within the generator enclosure 102 (see FIG. 1). Referring still to FIG. 2, in some embodiments, the system 100 further includes an air driver 156 that is coupled to the engine 108 (e.g., a driveshaft of the engine 108, an alternator, etc.) and powered by the engine 108 to direct ambient airflow toward the air-to-air coolers 112. The air driver 156 can be a fan (e.g., a blower) that is connected to the driveshaft or to an electric motor powered by an engine alternator.

In some embodiments, as shown in FIG. 2, the first stage air-to-air cooler 112*a* and the second stage air-to-air cooler 112*b* are each disposed in a parallel flow arrangement relative to the air driver 156 such that the air-to-air coolers 112 receive ambient airflow from the air driver 156 at substantially the same time. Such an arrangement can improve space utilization within the generator enclosure 102. Further, such an arrangement can eliminate or reduce the need for multiple air drivers.

In some embodiments, the charge air cooler assembly 114 further includes a frame support 158 that is configured to support first stage air-to-air cooler 112*a* and the second stage air-to-air cooler 112*b* within the generator enclosure 102. In the embodiment of FIG. 2, the frame support 158 is spaced a distance apart from the engine 108 so that the charge air cooler assembly 114 can be mounted to the generator enclosure 102 separately from the engine 108.

The frame support 158 supports the first stage air-to-air cooler 112*a* in position with respect to the second stage air-to-air cooler 112*b*. In the embodiment of FIG. 2, the frame support 158 supports the air-to-air coolers 112 so that the first stage air-to-air cooler 112*a* extends along the same reference plane 152 as the second stage air-to-air cooler 112*b*, and so that the first stage air-to-air cooler 112*a* and the second stage air-to-air cooler 112*b* are spaced apart from the engine 108 by a substantially equivalent distance 154*a*, 154*b* along a rotational axis 157 of the driveshaft of the engine 108.

Figure 3:
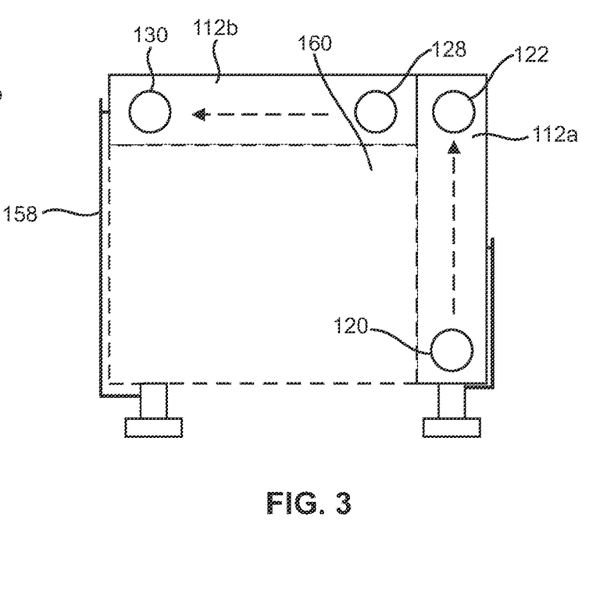
FIG. 3 is a front view of the charge air cooler assembly of FIG. 1, according to an embodiment.

The frame support 158 can also support the air-to-air coolers 112 in fixed position with respect to one another to facilitate transfer of charge air across the engine 108. In the embodiment of FIG. 3, the second stage air-to-air cooler 112*b* is disposed at an upper end of the first stage air-to-air cooler 112*a*. The second stage air-to-air cooler 112*b* extends away from the upper end of the first stage air-to-air cooler 112*a* such that the air-to-air coolers 112 together define an L shape.

Referring to FIG. 3, the system 100 can further include a radiator 160 to provide coolant to the engine 108. The radiator 160 can be coupled to the frame support 158. In some embodiments (as shown in FIG. 3), the first stage air-to-air cooler 112*a* and the second stage air-to-air cooler 112*b* together surround the radiator 160 on at least two sides such that the air-to-air coolers 112 and the radiator 160 are disposed in a parallel flow arrangement with respect to the air driver 156.

In some embodiments, the inlet 128 of the second stage air-to-air cooler 112*b* is disposed adjacent to the outlet 122 of the first stage air-to-air cooler. The outlet 130 of the second stage air-to-air cooler 112*b* is spaced horizontally apart from both the inlet 120 of the first stage air-to-air cooler and the outlet 122 of the first stage air-to-air cooler 112*a*. In some embodiments, the inlet 128 of the second stage air-to-air cooler 112*b*, the outlet 130 of the second stage air-to-air cooler 112*b*, and the outlet 122 of the first stage air-to-air cooler 112a are each disposed vertically above the inlet 120 of the first stage air-to-air cooler 112a.

Although the various embodiments are described herein with respect to air-to-air heat exchangers, it should be appreciated that other heat exchangers designs (including, for example, air-to-liquid heat exchangers) can be used in other embodiments without departing from the inventive principles disclosed herein.

Figure 4:
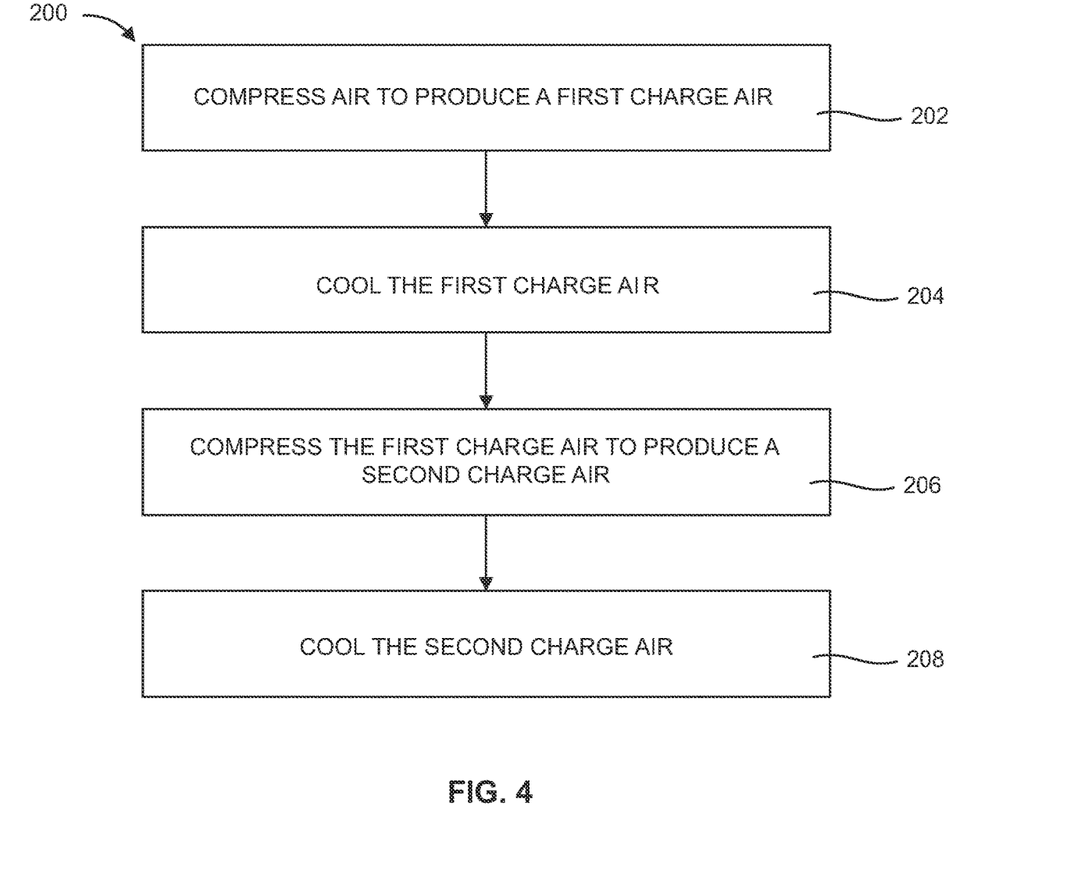
FIG. 4 is a flow diagram of a method of cooling charge air for an engine-generator system, according to an embodiment.

Referring to FIG. 4, a method 200 of cooling charge air for an engine system is shown, according to an embodiment. The method 200 can be implemented with any of the engine system arrangements described with reference to FIGS. 1-3. In other embodiments, the method 200 can include additional, fewer, and/or different operations.

Operation 202 includes compressing air using a first stage turbocharger to produce a first charge air. In some embodiments, operation 202 includes passing ambient air and/or filtered air from an air filter assembly through a first stage turbocharger to produce the first charge air at an elevated pressure relative to ambient air.

Operation 204 includes cooling the first charge air by passing the first charge air through a first stage air-to-air cooler along a first direction. In some embodiments, operation 204 includes passing the first charge air in a substantially vertical direction from a lower end to an upper end of the engine. In some embodiments, operation 204 includes directing the first charge air by a plurality of first tubes of the first stage air-to-air cooler that extend in a vertical direction toward a second stage turbocharger. Operation 204 includes cooling the first charge air by directing, via an air driver, ambient air across a second side of the first stage air-to-air cooler.

Operation 206 includes compressing the first charge air using a second stage turbocharger to produce a second charge air having a greater pressure than the first charge air. In some embodiments, operation 206 includes passing the first charge air through a conduit extending from the first stage air-to-air cooler to the second stage turbocharger.

Operation 208 includes cooling the second charge air by passing the second charge air through a second stage air-to-air cooler along a second direction that is different from the first direction. In some embodiments, operation 208 includes directing the second charge air away from the first stage air-to-air cooler in a direction that is substantially perpendicular to the first direction. In some embodiments, operation 208 includes passing the second charge air through a plurality of tubes of the second stage air-to-air cooler that are oriented substantially perpendicular to the first plurality of tubes in the first stage air-to-air cooler.

Figure 5:
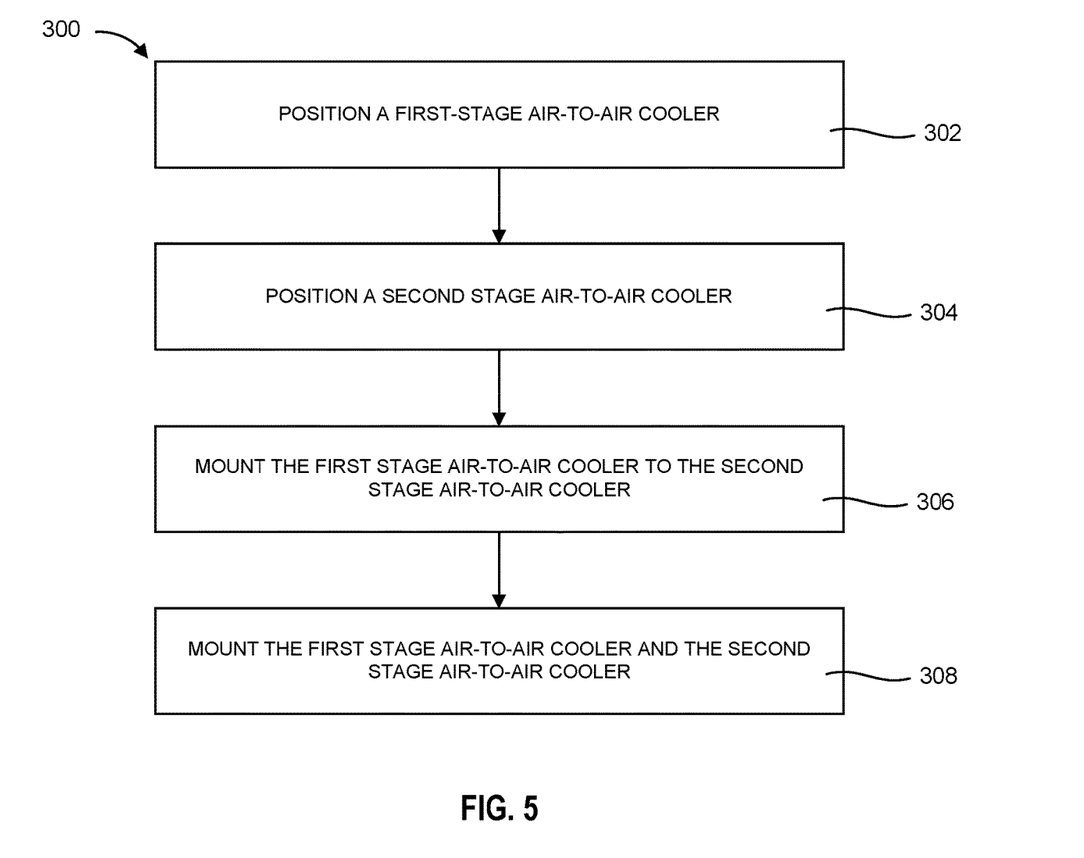
FIG. 5 is a method of making a charge air cooler assembly for an engine-generator system, according to an embodiment.

Referring to FIG. 5, a method 300 of making an air cooler assembly for an engine system is shown, such as any of the air cooler assemblies described with reference to FIGS. 1-3.

Operation 302 includes positioning a first stage air-to-air cooler so that a first air flow direction therethrough is oriented along a first direction. In some embodiments, operation 302 includes positioning the first stage air-to-air cooler onto a frame support so that a first plurality of tubes of the first stage air-to-air cooler are oriented along a vertical direction.

Operation 304 includes positioning a second stage air-to-air cooler so that a second air flow direction therethrough is oriented along a second direction that is substantially perpendicular to the first direction. In some embodiments, operation 304 includes positioning the second stage air-to-air cooler onto the frame support so that a first plurality of tubes of the first stage air-to-air cooler are oriented along a horizontal direction.

Operation 306 includes mounting the first stage air-to-air cooler to the second stage air-to-air cooler in an end-to-end arrangement so that an inlet of the second stage air-to-air cooler is adjacent to an outlet of the first stage air-to-air cooler. In some embodiments, operation 306 includes positioning the second stage air-to-air cooler along a vertical reference plane that extends through the first stage air-to-air cooler.

Operation 306 includes mounting the first stage air-to-air cooler and the second stage air-to-air cooler in a parallel flow arrangement with respect to an air driver of an engine. In some embodiments, operation 306 includes mounting the frame support to a base or floor wall of a generator enclosure a distance apart from the engine.

Figure 6:
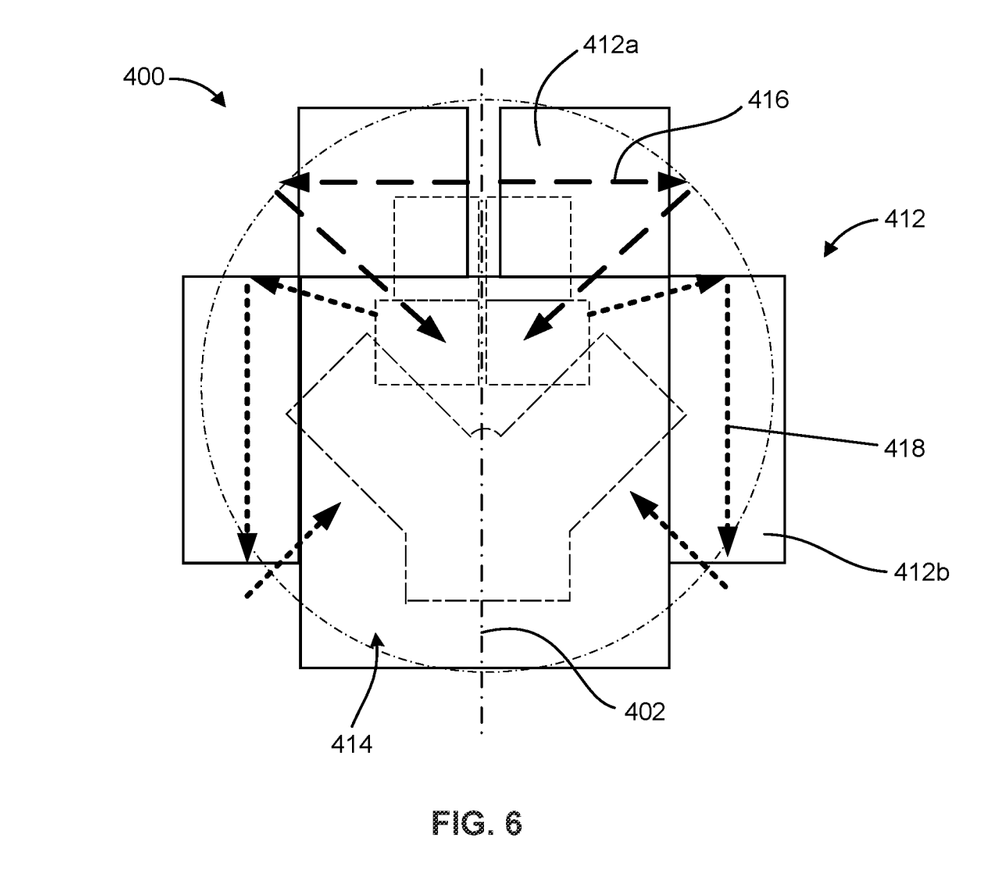
FIG. 6 is a front view of an engine powered system that includes a charge air cooler assembly, according to another embodiment.

As indicated above, although described herein with reference to an inline engine, similar principles can be utilized by different charge air cooler designs to redirect flow to other parts of the engine system, and to reduce the overall length of conduit required for the air intake system. Referring to FIG. 6, a charge air cooler assembly 414 for an engine system 400 including a Vee engine arrangement is shown, according to an embodiment. The engine system 400 includes a pair of two-stage turbocharger assemblies (e.g., four turbochargers in total) that are each configured to supply charge air to a respective one of a pair of cylinder banks of the engine system 400. The position of the turbochargers with respect to each cylinder bank, and along the engine system 400, can be different in various embodiments.

Referring still to FIG. 6, the charge air cooler assembly 414 includes a pair of air-to-air coolers for each cylinder bank. In some embodiments, the air-to-air coolers are arranged symmetrically about a reference plane 402 that extends between the cylinder banks of the engine system 400. In other embodiments, the design of a first pair of air-to-air coolers 412 for a first cylinder bank 403a of the engine system 400 is different from the design of a second pair of air-to-air coolers for a second cylinder bank 403b of the engine system 400. In the embodiment of FIG. 6, the first pair of air-to-air coolers 412 and the second pair of air-to-air coolers are identical in design.

The first pair of air-to-air coolers 412 includes a first stage air-to-air cooler 412a and a second stage air-to-air cooler 412b. The first stage air-to-air cooler 412a is configured to receive a first charge air 416 from a first stage turbocharger and is arranged to direct the first charge air 416 along a lateral direction (e.g., a horizontal direction when viewed from the front of the engine system 400 as shown in FIG. 6) and away from the reference plane 402. The second stage air-to-air cooler 412b is configured to receive a second charge air 424 from a second stage turbocharger and is arranged to direct the second charge air 424 in an axial direction (e.g., a vertical direction when viewed from the front of the engine system 400 as shown in FIG. 6) that is perpendicular to the lateral direction. Together, the first pair of air-to-air coolers 412 is configured to direct charge air around the first cylinder bank 403a. It should be understood that the arrangement of other aspects of the charge air cooler assembly 414 relative to the Vee engine may be the same as or similar to that described with reference to the charge air cooler assembly 114 of FIGS. 1-3.

It should be noted that the term "example" as used herein to describe various embodiments is intended to indicate that such embodiments are possible examples, representations, and/or illustrations of possible embodiments (and such term is not intended to connote that such embodiments are necessarily extraordinary or superlative examples).

As utilized herein, the term "substantially" and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed (e.g., within plus or minus five percent of a given angle or other value) are considered to be within the scope of the invention as recited in the appended claims.

The terms "coupled," "connected," and the like as used herein mean the joining of two members directly or indirectly to one another. Such joining can be stationary (e.g., permanent) or moveable (e.g., removable or releasable). Such joining can be achieved with the two members, or the two members and any additional intermediate members being integrally formed as a single unitary body with one another or with the two members or the two members and any additional intermediate members being attached to one another.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Other substitutions, modifications, changes and omissions can also be made in the design, operating conditions and arrangement of the various exemplary embodiments without departing from the scope of the embodiments described herein.

While this specification contains many specific implementation details, these should not be construed as limitations on the scope of any embodiment or of what can be claimed, but rather as descriptions of features specific to particular implementations of particular embodiments. Certain features described in this specification in the context of separate implementations can also be implemented in combination in a single implementation. Conversely, various features described in the context of a single implementation can also be implemented in multiple implementations separately or in any suitable subcombination. Moreover, although features can be described above as acting in certain combinations and even initially claimed as such, one or more features from a claimed combination can in some cases be excised from the combination, and the claimed combination can be directed to a subcombination or variation of a subcombination.

What is claimed is:

1. An internal combustion engine powered system comprising:
    an engine;
    an auxiliary device coupled to the engine;
    a first stage turbocharger coupled to the engine;
    an air driver;
    a radiator;
    a first stage air-to-air cooler fluidly coupled to the first stage turbocharger to receive a first charge air therefrom, the first stage air-to-air cooler arranged to direct the first charge air along a first direction from an inlet of the first stage air-to-air cooler to an outlet of the first stage air-to-air cooler;
    a second stage turbocharger fluidly coupled to the first stage air-to-air cooler; and
    a second stage air-to-air cooler fluidly coupled to the second stage turbocharger to receive a second charge air therefrom, the second stage air-to-air cooler being separate from the first stage air-to-air cooler and arranged to direct the second charge air along a second direction from an inlet of the second stage air-to-air cooler to an outlet of the second stage air-to-air cooler, the second direction being different from the first direction, the first stage air-to-air cooler and the second stage air-to-air cooler together surrounding the radiator on at least two sides, the air driver positioned axially between (i) the engine, and (ii) the first stage air-to-air cooler, the second stage air-to-air cooler, and the radiator.

2. The internal combustion engine powered system of claim 1, wherein the first direction extends in a vertical direction between a lower end of the engine and an upper end of the engine.

3. The internal combustion engine powered system of claim 2, wherein the engine further comprises an intake manifold and an exhaust manifold spaced apart from the intake manifold, the second direction extending parallel to a reference line representing a shortest distance between the intake manifold and the exhaust manifold.

4. The internal combustion engine powered system of claim 1, wherein the first stage air-to-air cooler and the second stage air-to-air cooler are spaced apart from the engine by a substantially equivalent distance along a rotational axis of a driveshaft of the engine.

5. The internal combustion engine powered system of claim 1, wherein the air driver is coupled to the engine and powered by the engine, the first stage air-to-air cooler and the second stage air-to-air cooler each disposed in a parallel flow arrangement relative to the air driver.

6. The internal combustion engine powered system of claim 1, further comprising:
    a first conduit fluidly coupling the first stage turbocharger to the first stage air-to-air cooler;
    a second conduit fluidly coupling the first stage air-to-air cooler to the second stage turbocharger;
    a third conduit fluidly coupling the second stage turbocharger to the second stage air-to-air cooler; and
    a fourth conduit extending away from the outlet of the second stage air-to-air cooler, the first conduit, the second conduit, the third conduit, and the fourth conduit each extending parallel to one another at a location adjacent to the first stage air-to-air cooler and the second stage air-to-air cooler.

7. The internal combustion engine powered system of claim 1, wherein the second stage air-to-air cooler forms an air conduit for the second charge air that directs the second charge air from a hot side of the engine to a cold side of the engine at lower temperature than the hot side.

8. The internal combustion engine powered system of claim 1, wherein the outlet of the second stage air-to-air cooler is disposed on an opposite side of the engine as each of the inlet of the second stage air-to-air cooler, and both the inlet and outlet of the first stage air-to-air cooler.

9. A charge air cooler assembly for air cooling, comprising:
    a radiator;

an air driver;

a first stage air-to-air cooler configured to receive first charge air, the first stage air-to-air cooler arranged to direct the first charge air along a first direction from an inlet of the first stage air-to-air cooler to an outlet of the first stage air-to-air cooler; and a second stage air-to-air cooler configured to receive second charge air, the second stage air-to-air cooler being separate from the first stage air-to-air cooler and arranged to direct the second charge air away from the first stage air-to-air cooler along a second direction from an inlet of the second stage air-to-air cooler to an outlet of the second stage air-to-air cooler, the second direction being different from the first direction, the first stage air-to-air cooler and the second stage air-to-air cooler together surrounding the radiator on at least two sides, the air driver positioned axially behind each of the first stage air-to-air cooler, the second stage air-to-air cooler, and the radiator.

10. The charge air cooler assembly of claim 9, wherein the first direction is substantially perpendicular to the second direction.

11. The charge air cooler assembly of claim 9, wherein the first direction is a vertical direction so that the outlet of the first stage air-to-air cooler is disposed vertically above the inlet of the first stage air-to-air cooler.

12. The charge air cooler assembly of claim 9, wherein the second direction is a horizontal direction.

13. The charge air cooler assembly of claim 9, wherein the inlet of the second stage air-to-air cooler is disposed adjacent to the outlet of the first stage air-to-air cooler, and wherein the outlet of the second stage air-to-air cooler is spaced horizontally apart from both the inlet of the first stage air-to-air cooler and the outlet of the first stage air-to-air cooler.

14. The charge air cooler assembly of claim 9, wherein the inlet of the second stage air-to-air cooler, the outlet of the second stage air-to-air cooler, and the outlet of the first stage air-to-air cooler are each disposed vertically above the inlet of the first stage air-to-air cooler.

15. The charge air cooler assembly of claim 9, wherein the first stage air-to-air cooler extends along a same reference plane as the second stage air-to-air cooler.

16. The charge air cooler assembly of claim 9, wherein the first stage air-to-air cooler includes a first plurality of tubes extending along the first direction, and the second stage air-to-air cooler includes a second plurality of tubes extending along the second direction.

17. A method of cooling charge air for an internal combustion engine system, comprising:

compressing air using a first stage turbocharger to produce a first charge air;

cooling the first charge air by passing the first charge air through a first stage air-to-air cooler that is disposed on a first side of a radiator, by passing the first charge air along a first direction through the first stage air-to-air cooler;

compressing the first charge air using a second stage turbocharger to produce a second charge air; and cooling the second charge air by passing the second charge air through a second stage air-to-air cooler that is separate from the first stage air-to-air cooler and that is disposed on a second side of the radiator, by passing the second charge air away from the first stage air-to-air cooler along a second direction that is different from the first direction, the cooling comprising providing air to the first stage air-to-air cooler and the second stage air-to-air cooler from an air driver positioned axially between (i) the internal combustion engine, and (ii) the first stage air-to-air cooler, the second stage air-to-air cooler, and the radiator.

18. The method of claim 17, wherein passing the first charge air through the first stage air-to-air cooler includes passing the first charge air through a plurality of tubes of the first stage air-to-air cooler that extend in a vertical direction.

19. The method of claim 17, wherein passing the second charge air through the second stage air-to-air cooler along the second direction includes directing the second charge air away from the first stage air-to-air cooler in a direction that is substantially perpendicular to the first direction.

* * * * *